US012566538B2

(12) United States Patent
Kim et al.

(10) Patent No.: US 12,566,538 B2
(45) Date of Patent: Mar. 3, 2026

(54) METHOD AND SYSTEM FOR DISPLAYING SCREEN OF CHATROOM AND PERFORMING CHATROOM TRANSITION

(71) Applicant: SAMSUNG SDS CO., LTD., Seoul (KR)

(72) Inventors: In Pyo Kim, Seoul (KR); Mi Geon Cho, Seoul (KR); Yoo Jung Kim, Seoul (KR); Da Gun Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 257 days.

(21) Appl. No.: 18/384,668

(22) Filed: Oct. 27, 2023

(65) Prior Publication Data

US 2024/0143140 A1 May 2, 2024

(30) Foreign Application Priority Data

Oct. 28, 2022 (KR) ........................ 10-2022-0141419

(51) Int. Cl.
*G06F 3/0484* (2022.01)
*G06F 3/0482* (2013.01)
*G06F 3/0488* (2022.01)

(52) U.S. Cl.
CPC .......... *G06F 3/0484* (2013.01); *G06F 3/0482* (2013.01); *G06F 3/0488* (2013.01); *G06F 2203/04803* (2013.01)

(58) Field of Classification Search
CPC .... G06F 3/0484; G06F 3/0482; G06F 3/0488; G06F 2203/04803; G06F 3/0483; G06F 3/04883; G06F 3/0481; H04L 51/224; H04L 51/04
See application file for complete search history.

(56) References Cited

U.S. PATENT DOCUMENTS

2016/0313877 A1 * 10/2016 Ha ...................... G06F 3/04842
2019/0268298 A1 * 8/2019 Kim ...................... H04L 51/226
2022/0337536 A1 * 10/2022 Meersma .............. H04L 51/224
2024/0403877 A1 * 12/2024 Miller .................... G06Q 20/24

FOREIGN PATENT DOCUMENTS

CN        111930450 A      11/2020
JP        2021-177334 A    11/2021
KR        10-2014-0125672 A  10/2014
KR        10-1614287 B1      4/2016
KR        10-2016-0126354 A  11/2016
KR        10-1674945 B1      11/2016
KR        10-1801188 B1      11/2017
KR        10-2020-0141838 A  12/2020
KR        10-2022-0019914 A   2/2022

* cited by examiner

*Primary Examiner* — Phuong H Nguyen
(74) *Attorney, Agent, or Firm* — Sughrue Mion, PLLC

(57) ABSTRACT

A method of performing chatroom transition, performed by a user terminal is provided. The method may include: continuously displaying, while a screen of a first chatroom that is active is displayed on a user terminal, a first notification bar indicating at least one first new message occurring in a second chatroom; and activating the second chatroom and displaying a screen of the second chatroom, instead of the screen of the first chatroom, in response to a first user input to select the first notification bar.

16 Claims, 14 Drawing Sheets

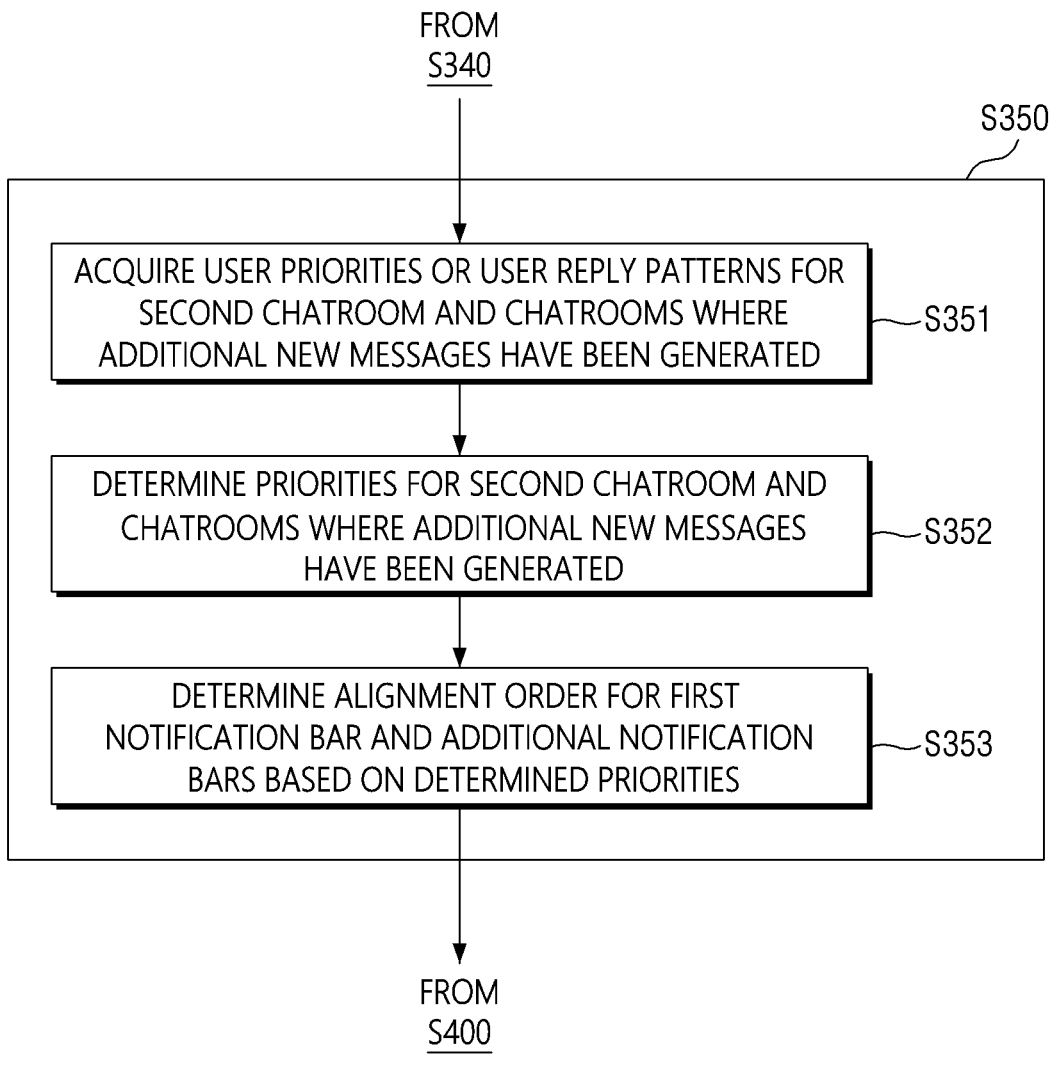

FROM
S340

S350

ACQUIRE USER PRIORITIES OR USER REPLY PATTERNS FOR
SECOND CHATROOM AND CHATROOMS WHERE
ADDITIONAL NEW MESSAGES HAVE BEEN GENERATED — S351

DETERMINE PRIORITIES FOR SECOND CHATROOM AND
CHATROOMS WHERE ADDITIONAL NEW MESSAGES
HAVE BEEN GENERATED — S352

DETERMINE ALIGNMENT ORDER FOR FIRST
NOTIFICATION BAR AND ADDITIONAL NOTIFICATION
BARS BASED ON DETERMINED PRIORITIES — S353

FROM
S400

DETECT OCCURRENCE
OF ADDITIONAL
NEW MESSAGES

USER PRIORITIES

USER REPLY PATTERNS

DETERMINE ALIGNMENT
ORDER FOR FIRST
NOTIFICATION BAR AND
ADDITIONAL
NOTIFICATION BARS

METHOD AND SYSTEM FOR DISPLAYING SCREEN OF CHATROOM AND PERFORMING CHATROOM TRANSITION

CROSS-REFERENCE TO RELATED APPLICATION

This application claims priority from Korean Patent Application No 10-2022-0141419 filed on Oct. 28, 2022 in the Korean Intellectual Property Office, and all the benefits accruing therefrom under 35 U.S.C. 119, the contents of which in its entirety are herein incorporated by reference.

BACKGROUND

1. Field

The present disclosure relates to a method for displaying a screen of a chatroom and performing chatroom transition, which is capable of streamlining user input for screen transitions between chatrooms on a user terminal, and a system to which the method is applied.

2. Description of the Related Art

Communication via messengers is frequent on user terminals such as mobile terminals and personal computers (PCs). During communication via a messenger, whenever messages are received from other parties, repeatedly locating and moving to chatrooms that include the corresponding parties is necessary to engage in a conversation.

Additionally, during a conversation, notifications of new messages are displayed in a currently active chatroom only for a few seconds and then disappear. Once these notifications vanish, there is the inconvenience of navigating to the chatroom list to find and enter the relevant chatrooms.

Therefore, there is a demand for a method that allows easy transition to another chatroom within the current chatroom screen without the repetitive task of navigating through the chatroom list when receiving a new message from another party during a conversation.

SUMMARY

Aspects of the present disclosure provide a method for displaying a screen of a chatroom and performing the operation of switching between different chatrooms through multiple chat platforms such as instant messengers and a computing system to which the method is applied.

Aspects of the present disclosure also provide a method and a computing system to which a new message notification method is applied, and the new message notification method enables a user to continuously be aware of newly generated messages in other chatrooms while he or she is engaged in a conversation in a specific chatroom.

Aspects of the present disclosure also provide a method and a system for filtering and instantly identifying only essential messages within a chatroom screen that is currently active and displayed on a user terminal.

Aspects of the present disclosure also provide a method and a system for changing the arrangement of notifications pointing to new messages in a chatroom screen that is currently active and displayed on a terminal, when there are multiple new messages generated in different chatrooms, based on priority.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the disclosure, provided is a method of performing chatroom transition, performed by a user terminal, the method including: continuously displaying, while a screen of a first chatroom that is active is displayed on a user terminal, a first notification bar indicating at least one first new message occurring in a second chatroom; and activating the second chatroom and displaying a screen of the second chatroom, instead of the screen of the first chatroom, in response to a first user input to select the first notification bar.

In some embodiments, the continuously displaying the first notification bar may include: displaying a preview popup for the at least one first new message on the screen of the first chatroom for a predetermined amount of time; and after the predetermined amount of time has elapsed, continuously displaying the first notification bar on the screen of the first chatroom.

In some embodiments, the first notification bar may display an indicator for the second chatroom, and the indicator for the second chatroom may include at least one of a name of the second chatroom or at least one participant in the second chatroom.

In some embodiments, the continuously displaying the first notification bar may include continuously displaying the first notification bar on or above a keypad area on the screen of the first chatroom.

In some embodiments, the continuously displaying the first notification bar may include displaying a content of the at least one first new message in response to a second user input to select the first notification bar, the second user input being a different input type than the first user input.

In some embodiments, the displaying the content of the at least one first new message may include displaying the content of a most recently occurring first new message among the at least one first new message occurring in the second chatroom.

In some embodiments, the continuously displaying the first notification bar may include displaying a preview screen for the second chatroom in response to a third user input to select the first notification bar, the third user input being a different input type than the first user input.

In some embodiments, the third user input is a long tap, and the displaying the preview screen for the second chatroom may include removing the preview screen for the second chatroom in response to the long tap being cancelled.

In some embodiments, the continuously displaying the first notification bar may include continuously displaying the first notification bar on the screen of the first chatroom only based on the at least one first new message or information regarding the second chatroom satisfying a predefined condition.

In some embodiments, the continuously displaying the first notification bar may include continuously displaying the first notification bar on the screen of the first chatroom unless a user input to remove the first notification bar is received.

In some embodiments, the continuously displaying the first notification bar may include continuously displaying the first notification bar on the screen of the first chatroom only based on the information regarding the second chatroom representing a group chatroom and an indication of a user of the user terminal being included in a content of at least one first new message occurring in the group chatroom.

In some embodiments, the continuously displaying the first notification bar may include continuously displaying a second notification bar indicating at least one second new message on the screen of the first chatroom along with the first notification bar based on the at least one second new message occurring in a third chatroom.

In some embodiments, the continuously displaying the second notification bar may include: based on at least one additional new message occurring in one or more inactive chatrooms, continuously displaying one or more additional notification bars corresponding to the one or more inactive chatrooms on the screen of the first chatroom, the one or more additional notification bars indicating the at least one additional new message; and based on a number of the one or more additional notification bars exceeding a reference value, providing a scroll for the first notification bar and the one or more additional notification bars in response to a swipe gesture in a notification bar display area on the screen of the first chatroom.

In some embodiments, the continuously displaying the second notification bar may include determining a priority of the second chatroom and a priority of the third chatroom and determining a display location of the first notification bar and a display location of the second notification bar based on the determined priorities.

In some embodiments, the determining the display locations of the first and second notification bars may include displaying the first notification bar at a higher priority location based on an indication of a user of the user terminal being included in a content of the at least one first new message occurring in the second chatroom, but not in a content of the at least one second new message occurring in the third chatroom.

In some embodiments, the determining the display locations of the first and second notification bars may include displaying the first notification bar at a higher priority location based on an occurrence frequency of the at least one first new message in the second chatroom being higher than an occurrence frequency of the at least one second new message in the third chatroom.

In some embodiments, the method may further include: analyzing, for a user of the user terminal, a reply pattern for the second chatroom and a reply pattern for the third chatroom; and determining the display locations of the first notification bar and the second notification bar based on the analyzed reply patterns and the determined priorities.

In some embodiments, the displaying the screen of the second chatroom, instead of the screen of the first chatroom, may include continuously displaying the second notification bar on the screen of the second chatroom.

According to an aspect of the disclosure, provided is a chat system including: one or more processors; and a memory configured to store one or more instructions, wherein the one or more processors are configured to, by executing the one or more instructions stored in the memory, perform: continuously displaying, while a screen of a first chatroom that is active is displayed on a user terminal, a first notification bar indicating at least one first new message occurring in a second chatroom; and activating the second chatroom and displaying a screen of the second chatroom, instead of the screen of the first chatroom, based on a user input to select the first notification bar.

According to an aspect of the disclosure, provided is a non-transitory computer-readable recording medium storing a computer program, which, when executed by at least one processor, causes the at least one processor to perform: continuously displaying, while a screen of a first chatroom that is active is displayed on a user terminal, a first notification bar indicating at least one first new message occurring in a second chatroom; and activating the second chatroom and displaying a screen of the second chatroom, instead of the screen of the first chatroom, based on a user input to select the first notification bar.

BRIEF DESCRIPTION OF THE DRAWINGS

The above and other aspects and features of the present disclosure will become more apparent by describing in detail exemplary embodiments thereof with reference to the attached drawings, in which:

FIG. 9 is a detailed flowchart illustrating some operations of the method of FIG. 8;

DETAILED DESCRIPTION

Figure 1:
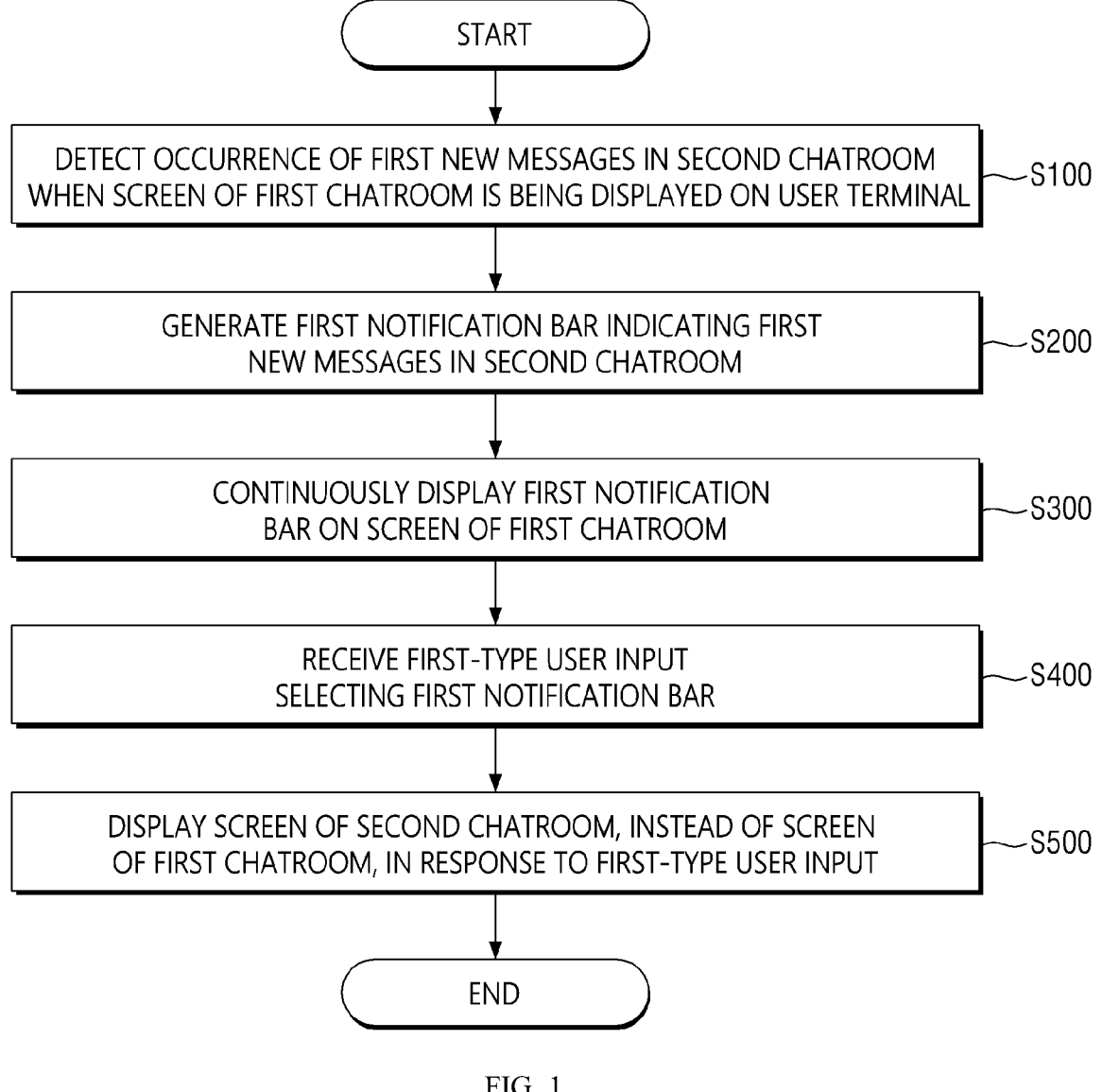
FIG. 1 is a flowchart illustrating a method of simplifying chatroom transition according to an embodiment of the present disclosure.

Hereinafter, example embodiments of the present disclosure will be described with reference to the attached drawings. Advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will be defined by the appended claims and their equivalents.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that may be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), may be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, embodiments of the present disclosure will be described with reference to the attached drawings.

Before explaining a method (hereinafter referred to as a chatroom transition simplification method) of simplifying chatroom transition according to some embodiments of the present disclosure, the operational environment of a chat system in which the chatroom transition simplification method may be implemented will hereinafter be described. The chat system may be configured to include a chat service server and multiple user terminals.

The chat service server may collect new messages generated in multiple chatrooms from the user terminals. For example, the chat system may collect messages generated within or received by a first chatroom via a communication network within the user terminals.

As a result, the chat system may activate and display the first chatroom on the user terminals.

Here, activating a specific chatroom means that the specific chatroom dominates a chatroom display area within the screen area of a chat service application so that other chatrooms are not visible. Therefore, when the specific chatroom is activated, a user cannot view other chatrooms than the specific chatroom. Consequently, if the user wants to view conversations in the other chatrooms, the user may have to input user commands on their user terminal for chatroom transition.

The chat system may check for new messages (hereinafter referred to as the first new messages) generated in or received by a second chatroom, which is different from the first chatroom. In this case, the chat system may also store the first new messages in a designated storage.

Additionally, the chat system may create a notification bar (hereinafter referred to as the first notification bar) to represent the first new messages and may continuously display the first notification bar on the screen of the first chatroom.

For example, regardless of the screen of the first chatroom currently being displayed, the chat system may display the first new messages generated in the second chatroom on the screen of the first chatroom.

In this example, the first notification bar may be displayed on the screen of the first chatroom in a particular form or may be represented with specific values, but the present disclosure is not limited thereto.

Furthermore, the chat system may receive first-type user input targeting the first notification bar, which represents the first new messages, from the screen of the first chatroom currently being displayed.

For example, the first-type user input may refer to an input that selects the first notification bar, such as a short tap or click on the first notification bar, but the present disclosure is not limited thereto.

Thereafter, in response to the first-type user input, the chat system may activate and display the second chatroom on the user terminals.

In other words, the first-type user input may serve as means to activate the screens of the user terminals for transitioning from the first chatroom to the second chatroom, and the chat system may switch the user terminals from the screen of the first chatroom to the screen of the second chatroom.

For example, when the first new messages are received from the second chatroom, which is not associated with the screen of the first chatroom currently being displayed, the chat system may enable the user to immediately switch from the screen of the first chatroom to the screen of the second chatroom by selecting the first notification bar created to represent the first new messages in the second chatroom. As a result, the user may easily and swiftly move between chatrooms without navigating through a chatroom list screen for chatroom transitions.

Also, for example, the chat system may create and adjust the first notification bar to be displayed at a particular location on the screen of the first chatroom. The adjustment of the position of the first notification bar may be performed in response to user input of a different type from the first-type user input, and this will be described later with reference to FIG. 3.

Also, for example, when the chat system determines that the user no longer requires the first notification bar, the chat system may also remove the first notification bar in response to particular-type user input, and this will be described later with reference to FIG. 4.

Also, for example, in response to particular-type user input (hereinafter referred to as second-type user input) that selects the first notification bar, the chat system may provide previews of messages included in the second chatroom that the user intends to switch to, and this will be described later with reference to FIGS. 5 and 6.

Also, for example, the chat system may acquire predefined filtering information. Therefore, the chat system may choose not to create notification bars for new messages and information regarding their corresponding chatrooms that the user considers unimportant and does not want to display on their user terminal, and this will be described later with reference to FIG. 7.

For reference, the filtering information may be determined based on settings input by the user, and this will be described with reference to FIG. 7.

Also, for example, the chat system may collect additional new messages from one or more inactive chatrooms. Consequently, the chat system may create a notification bar (hereinafter referred to as the second notification bar) containing the list of the inactive chatrooms where the additional new messages have occurred.

Also, the chat system may determine a method to arrange the list of the inactive chatrooms within the second notification bar, and this will be described later with reference to FIGS. 8 through 13.

The chat system may be implemented by at least one user terminal. Here, the user terminal may encompass any device equipped with computing capabilities, and an exemplary user terminal will be described later with reference to FIG. 14.

As the user terminal comprises various components, the user terminal may also be referred to as a computing system. In this context, the computing system may be interpreted as an ensemble where multiple computing devices interact.

The user terminal where the screens of first and second chatrooms are displayed may refer to a device and/or system serving as a display target.

The chat system where the chatroom transition simplification method is executed has been, or will continuously be, described as being a display target providing particular services, but the display target may vary. For example, the display target may be a user PC.

Thus far, a brief overview of the chat system and its operational environment in some embodiments of the present disclosure has been provided. A detailed description of the overall process of the chatroom transition simplification method that may be executed in the chat system will be presented with reference to FIG. 1.

For clarity and convenience, it is assumed that all steps/operations of methods that will hereinafter be described are performed in the operational environment of the chat system previously explained. Therefore, if the subject of a specific step/operation is omitted, it may be understood that the specific step/operation is performed in the chat system. However, in actual practice, some steps/operations of the methods that will hereinafter be described may be performed on different computing devices, and the operational environment of the chat system may be configured differently from what has been explained earlier.

FIG. 1 is a flowchart illustrating a chatroom transition simplification method according to an embodiment of the present disclosure. However, the embodiment of FIG. 1 is merely exemplary, and it is understood that some steps may be added or removed as needed.

Referring to FIG. 1, the chatroom transition simplification method may start with S100, which involves checking for first new messages generated in a second chatroom, while displaying the screen of a first chatroom that is currently active and displayed on the user terminal of a user.

For example, the second chatroom where the first new messages have been generated may refer to a chatroom unrelated to the first chatroom currently active and displayed or a chatroom that is related to the first chatroom to some degree but separate from the first chatroom.

Furthermore, since multiple first new messages may occur in multiple chatrooms, there may not necessarily be a single second chatroom, but actually, there may be multiple second chatrooms where the multiple first new messages have been generated. However, the present disclosure is not limited to this.

The types of new messages that the chat system checks for are not particularly limited. That is, new messages may include, for example, messages, media, files, and information that have been newly generated and included in a chatroom, but the present disclosure is not limited thereto.

In step S200, the chat system may create a first notification bar that points to the first new messages in the second chatroom.

For example, the chat system may create a first notification bar containing information about the newly received first new messages. In this example, the created first notification bar may be displayed in a particular form or may have specific values, as explained earlier.

Furthermore, the first notification bar may contain information regarding the first new messages and may further contain information regarding the second chatroom where the first new messages are included.

The information regarding the second chatroom, included in the first notification bar, may include the name of the second chatroom, participants in the second chatroom, and the number of unread first new messages in the second chatroom.

Therefore, the chat system may also use the information regarding the second chatroom, included in the first notification bar, to display the first notification bar on the screen of the first chatroom currently displayed.

Additionally, the chat system may display a brief notification for the first new messages generated in the second chatroom on the screen of the first chatroom for a certain period of time. This may be understood as a step to call the user's attention to the information regarding the first new messages.

Accordingly, the chat system may create the first notification bar either simultaneously with the occurrence or reception of the first new messages in the second chatroom or when the brief notification for the first new messages disappears after being displayed on the screen of the first chatroom for a certain period of time.

As a result, unless the first notification bar is manually removed by the user, the first notification bar may be able to be continuously displayed on the user terminal, instead of a typical short-lived notification that disappears after the occurrence of new messages in different chatrooms.

In step S300, the chat system may continuously display the first notification bar on the screen of the active first chatroom currently active and displayed. In this case, the location of the first notification bar on the screen of the first chatroom is not particularly limited.

Consequently, as explained with regard to S200, the chat system may keep the first notification bar persistently visible on the screen of the user terminal that is currently being displayed, replacing a typical short-lived notification for new messages occurrences.

Therefore, the trouble of leaving the first chatroom and then searching for the second chatroom from the list of multiple chatrooms may be saved, and the user may conveniently access the second chatroom where the first new messages have occurred.

In step S400, the chat system may receive first-type user input that selects the first notification bar. The first-type user input may involve an action such as a quick tap or click to choose the first notification bar.

The chat system may recognize the first-type user input, which is determined in advance for the first notification bar indicating the presence of the first new messages, and may then generate a reception signal. For example, the first-type user input may be set in advance by the user, but the present disclosure is not limited thereto.

Consequently, when user input of a different type from the first-type user input is detected, the chat system may maintain the display of the screen of the first chatroom.

In step S500, the chat system may instantly transition from the screen of the first chatroom currently active and displayed to the screen of the second chatroom in response to the first-type user input selecting the first notification bar.

That is, the chat system may deactivate the first chatroom currently active and displayed on the user terminal and may activate the second chatroom where the first new messages, indicated by the first notification bar, are located.

For example, if the first-type user input, such as a brief tap or click on the first notification bar, is detected, the chat system may switch the first chatroom to the second chatroom and may display the screen of the second chatroom.

Accordingly, since the need for navigating to a screen displaying a list of chatrooms for switching between the chatrooms may be eliminated, the chat system may enable the user to promptly access or switch to the second chatroom including the first new messages.

Up to this point, the overall process of the chatroom transition simplification method has been described with reference to FIG. 1. As previously mentioned, the screen of the user terminal may quickly transition through the first notification bar, representing the first new messages confirmed within the second chatroom.

As a result, the confirmation of the first new messages may become more convenient on the screen of the first chatroom currently active and displayed, and by simplifying the steps for screen transitions on the user terminal, the load on the chat system within the user terminal may be significantly reduced.

Various embodiments of the chatroom transition simplification method will hereinafter be described with reference to FIGS. 2 through 13.

Figure 2:
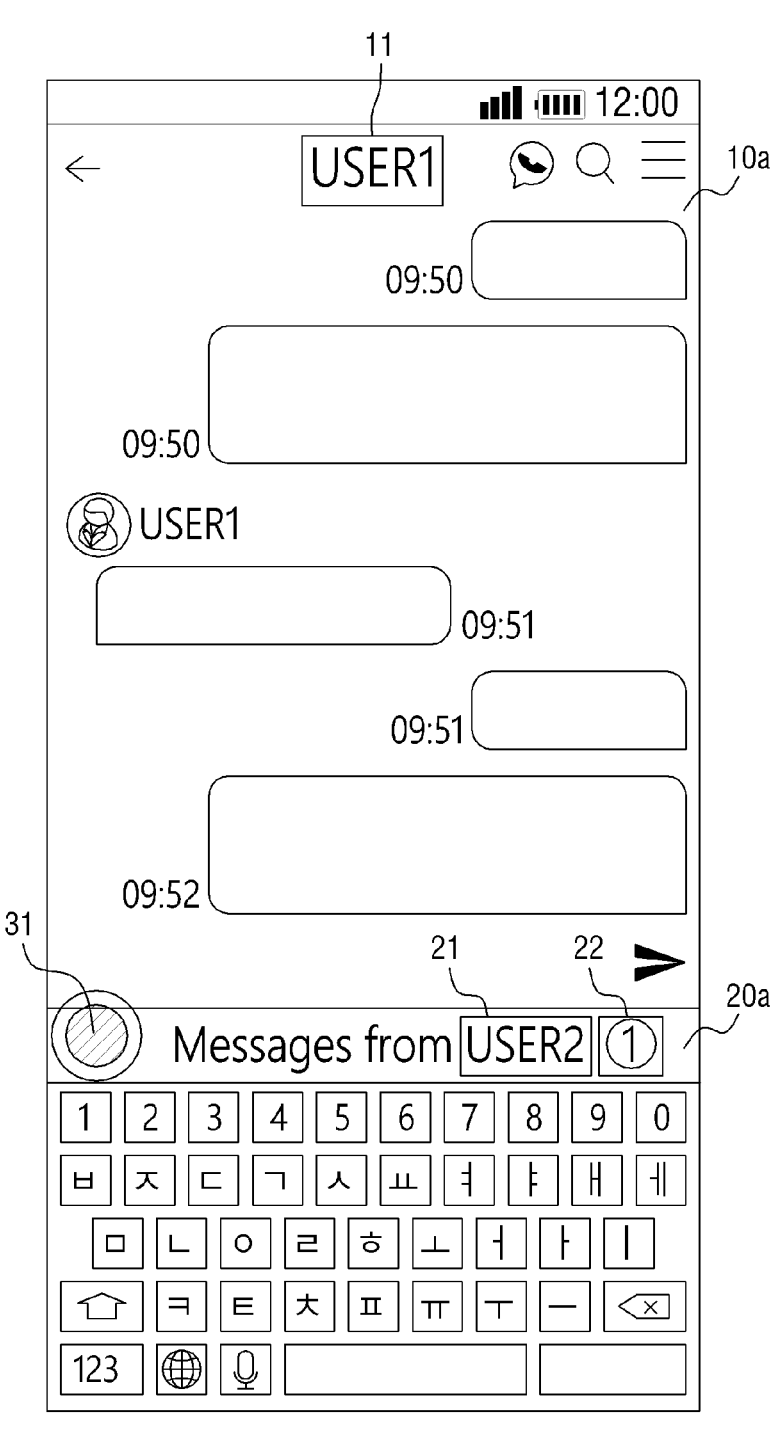
FIG. 2 is a schematic view illustrating the screen of a first chatroom displayed according to some embodiments of the present disclosure.

FIG. 2 is a schematic view illustrating how a first notification bar 20a is displayed on a screen 10a of a first chatroom currently displayed according to some embodiments of the present disclosure. Specifically, for convenience, FIG. 2 depicts how the first notification bar 20a may be displayed using information regarding a second chatroom where first new messages have been generated.

Referring to FIG. 2, the screen 10a is currently displayed on the user terminal of the user, and the second chatroom is displayed within the first notification bar 20a generated on the screen 10a.

In this case, as explained earlier with reference to FIG. 1, the chat system may generate the first notification bar 20a and include information regarding the second chatroom within the first notification bar 20a.

For example, referring to FIG. 2, the chat system may select and display one of the name of the second chatroom and participants of the second chatroom within the notification bar 20a, as indicated by reference numeral 21.

The chat system may also display the number of new messages within the second chatroom that the user has not checked, as indicated by reference numeral 22.

For example, referring to FIG. 2, user input 31 of a first type, such as a tap or click, may be defined in advance in the chat system by the user as user input for selecting the first notification bar 20a, but the present disclosure is not limited thereto.

Some embodiments of a chatroom screen transition process according to the present disclosure will hereinafter be described with reference to FIGS. 2 through 13, assuming that, as depicted in FIG. 2, multiple user inputs that may be entered to the screen of a first chatroom are defined.

Figure 3:
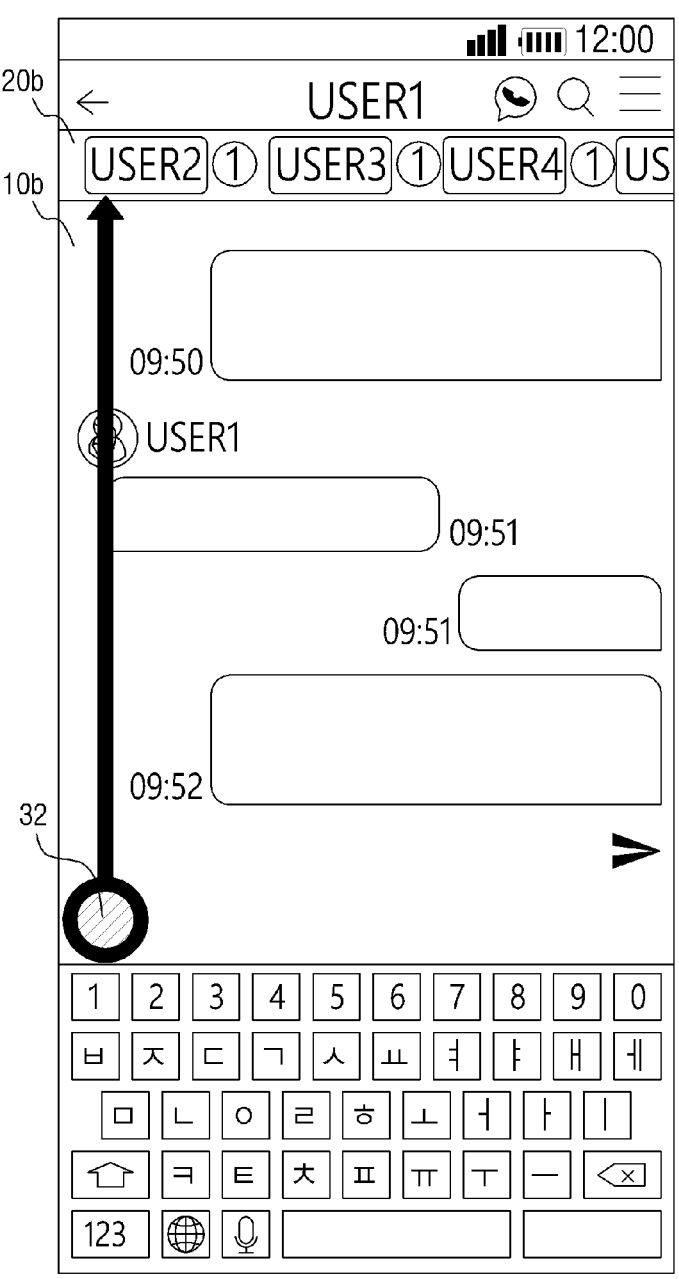
FIG. 3 is a schematic view illustrating the adjustment of the location of a notification bar generated according to some embodiments of the present disclosure.

FIG. 3 is a schematic view illustrating the moving of a first notification bar to a particular location within the screen of a first chatroom according to some embodiments of the present disclosure.

Referring to FIG. 3, in some embodiments, the chat system may generate a first notification bar 20b indicating first new messages, on a screen 10b of a first chatroom currently displayed on the user terminal of the user.

In this case, the chat system may move the first notification bar 20b within the screen 10b using user input of a different type from the first-type user input of FIG. 2.

For example, the chat system may define an action 32 of long-tapping or long-clicking the first notification bar 20b and simultaneously dragging the first notification bar 20b to a particular location within the screen 10b as user input for moving the first notification bar 20b to the particular location within the screen 10b, but the present disclosure is not limited thereto.

As a result, the chat system allows the user to move the first notification bar 20b to any particular location at their discretion, achieving efficiency and visibility effects that do not interfere with actions within the first chatroom currently displayed.

Specifically, referring to FIG. 3, the chat system may display the first notification bar 20b in a bar shape, and the first notification bar 20b from the bottom to the top of the screen 10b by dragging the first notification bar 20b upward to while long-tapping the first notification bar 20b.

The chat system may generate the first notification bar 20b in various shapes or sizes, thereby reducing the space occupied by the first notification bar 20b on the screen 10b. Consequently, user visibility may be further improved.

Meanwhile, in some embodiments, the chat system may remove a first notification bar if the first notification bar is deemed unnecessary. This will hereinafter be described with reference to FIG. 4.

Figure 4:
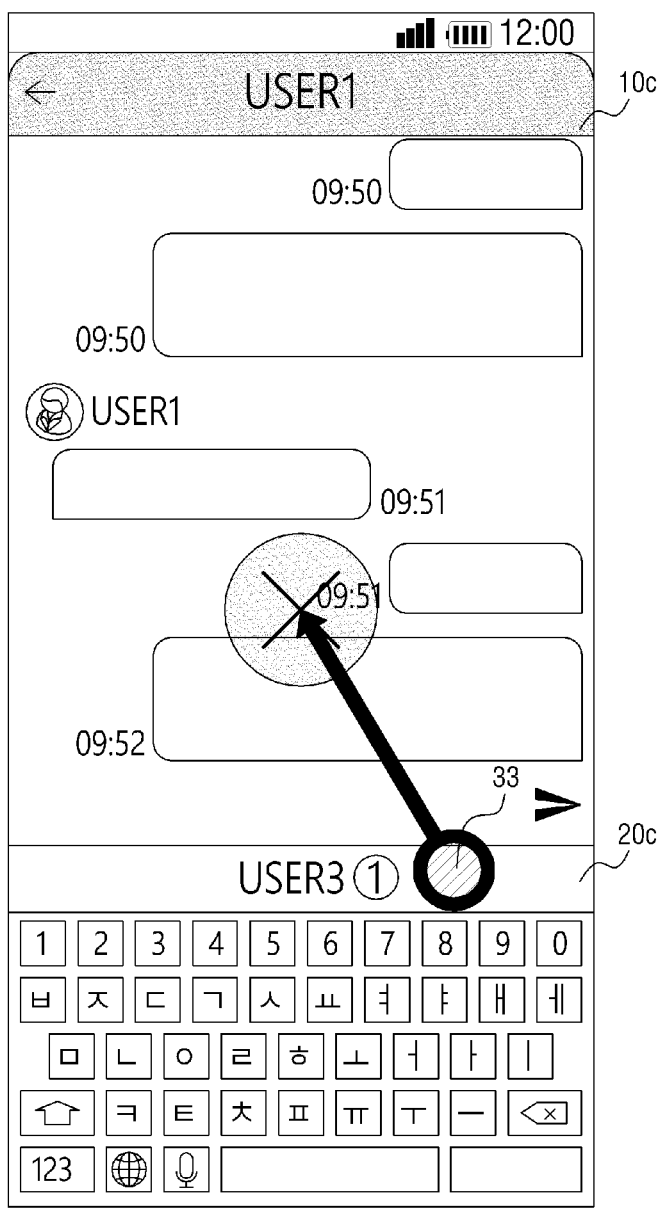
FIG. 4 is a schematic view illustrating the deletion of a notification bar generated according to some embodiments of the present disclosure.

FIG. 4 is a schematic view illustrating the removal of a first notification bar generated according to some embodiments of the present disclosure.

Referring to FIG. 4, in response to user input of a different type from first-type user input, the chat system may remove a first notification bar 20c generated on a screen 10c of a first chatroom currently being displayed on the screen of the user terminal of the user.

For example, the chat system may define an action 33 of long-tapping or lock-clicking the first notification bar 20c and simultaneously dragging the first notification bar 20c to a location 23 within the screen 10c where a removal function may be activated, but the present disclosure is not limited thereto.

Specifically, referring to FIG. 4, when the user long-taps the first notification bar 20c at the bottom of the screen 10c and simultaneously drags the first notification bar 20c to the location 23, the chat system may remove the first notification bar 20c.

In this case, the chat system may display a particular indication of the location 23 within the screen 10c where the removal function may be activated.

Alternatively, the chat system may define the action of long-tapping or long-clicking the first notification bar 20c while simultaneously dragging the first notification bar 20c outside the screen 10c as the user input for removing the first notification bar 20c, but the present disclosure is not limited thereto.

Meanwhile, in some other embodiments, the chat system may offer a preview of the content of first new messages and a second chatroom through a first notification bar, and this will hereinafter be described with reference to FIGS. 5 to 6.

Figure 5:
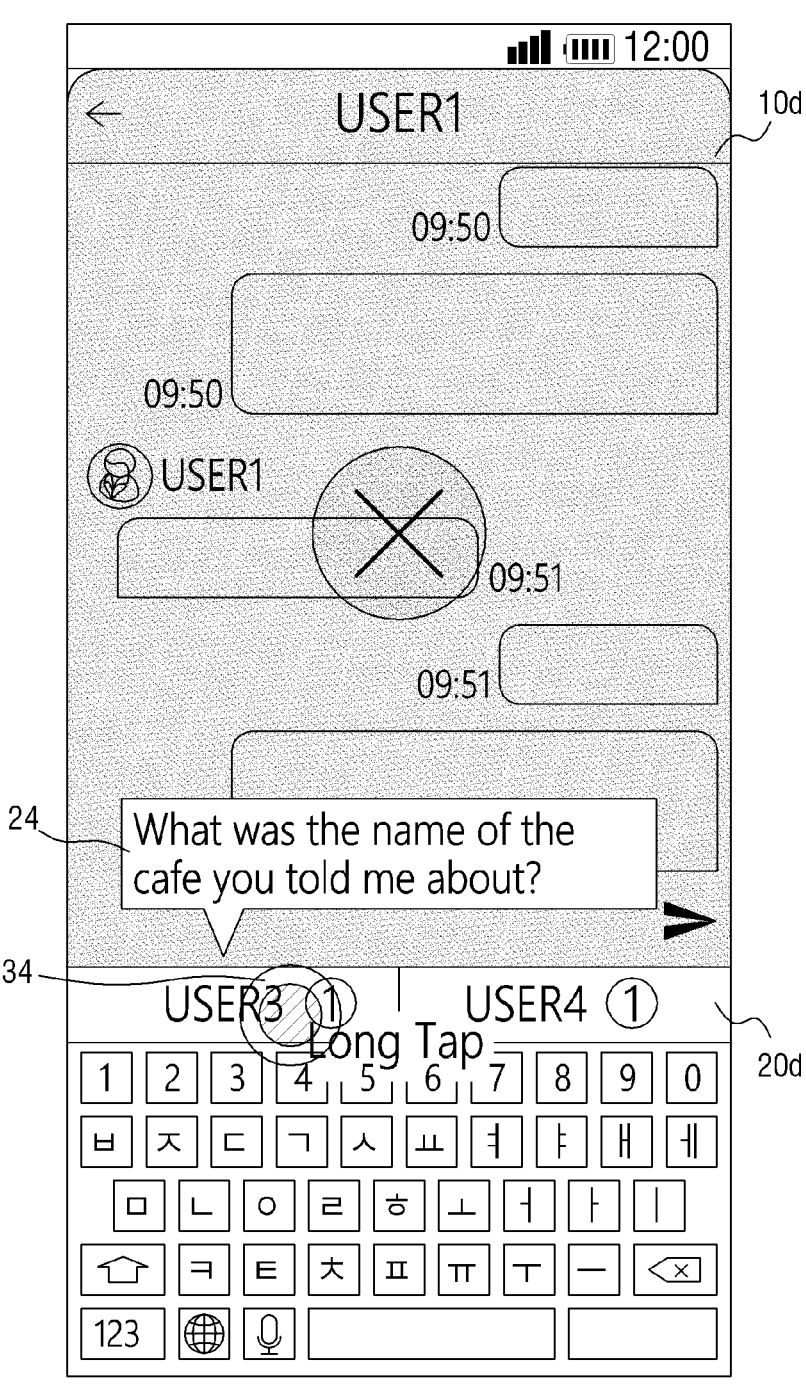
FIGS. 5 and 6 are schematic views illustrating how a second chatroom screen may be previewed through a first notification bar generated according to some embodiments of the present disclosure.
Figure 6:
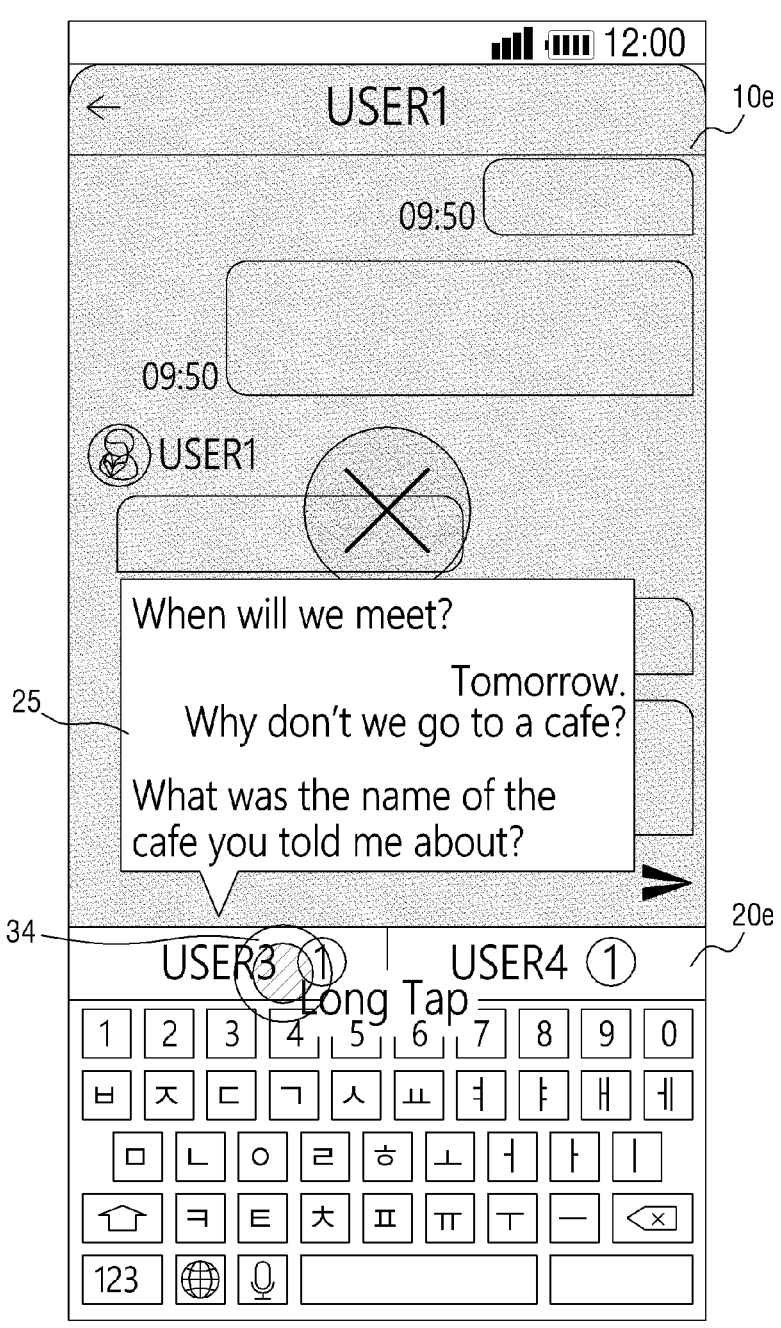

FIGS. 5 and 6 illustrate how a second chatroom screen may be previewed through a first notification bar generated according to some embodiments of the present disclosure.

For example, when a particular input, i.e., second-type user input, is applied to a first notification bar 20*d*, which is located on a screen 10*d* of a first chatroom currently displayed on the user terminal of the user, the chat system may display a preview screen containing the content of a first new message indicated by the first notification bar 20*d*.

For example, the chat system may define an action 34 of long-tapping or long-clicking the first notification bar 20*c* as second-type user input for displaying the preview screen, but the present disclosure is not limited thereto.

Specifically, referring to FIG. 5, in response to the second-type user input for the first notification bar 20*d*, the chat system may display a preview screen 24 containing the content of the first new message indicated by the first notification bar 20*d* on the screen 10*d* currently displayed on the user terminal.

For example, when multiple first new messages occur or are received in the second chatroom, the chat system may display the preview screen 24 containing only the content of the most recently occurred or received new message among the multiple first new messages in the second chatroom.

Referring to FIG. 6, in response to second-type user input for a first notification bar 20*e*, which is displayed on a screen 10*e* of a first chatroom, the chat system may also display a preview screen 25, which is a reduced-size screen of a second chatroom included in the first notification bar 20*e*.

As a result, the chat system allows the user to quickly identify the content of first new messages that have occurred in the second chatroom within the screen 10*e* currently displayed, through the first notification bar 20*e*.

Meanwhile, in some other embodiments, the chat system may filter the generation of a first notification bar representing first new messages, using predefined filtering information. This will hereinafter be described with reference to FIG. 7.

Figure 7:
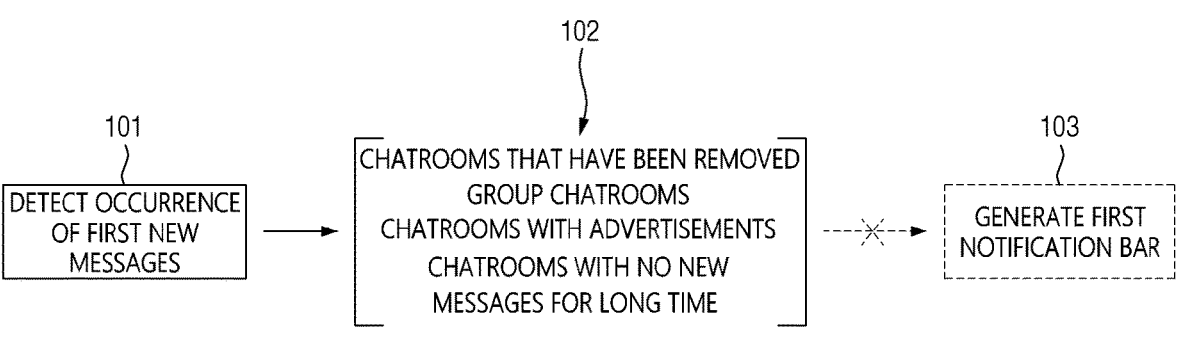
FIG. 7 is a flowchart illustrating a method of not generating a first notification bar using filtering information according to some embodiments of the present disclosure.

FIG. 7 is a flowchart illustrating a method of not generating a first notification bar using filtering information according to some embodiments of the present disclosure.

For example, the chat system may filter some of a plurality of first new messages that have occurred in a second chatroom, based on filtering information such that the corresponding first new messages may not be displayed on the screen of a first chatroom. The filtering information may have been set in advance by the user.

That is, the chat system may receive information regarding the characteristics of first new messages that do not require notifications, among other first new messages that may occur in second chatrooms, from the user, and may then include the received information in the filtering information.

Specifically, referring to "102" of FIG. 7, the chat system may include information regarding second chatrooms indicated by first notification bars that have been removed from the screen of the first chatroom in the filtering information, which is received and set in advance by the user.

The filtering information may include information regarding second chatrooms indicated by the first notification bars that have been removed from the screen of the first chatroom, or information regarding second chatrooms that the user has left with their user terminal.

Additionally, the chat system may include, in the filtering information, information regarding group chatrooms on the user terminal, first new messages containing advertisements, and second chatrooms where new messages have not been generated for a considerable amount of time, but the present disclosure is not limited thereto.

That is, referring to "101" and "103" of FIG. 7, if the occurrence of first new messages in a second chatroom is detected when the first chatroom is currently activated and displayed on the user terminal, the chat system may choose not to generate a first notification bar for the corresponding first new messages, based on the filtering information.

As a result, the chat system may reduce the system load by preemptively avoiding the generation of notification bars for some new messages.

Meanwhile, in some embodiments, if second new messages additionally occur or are received in a third chatroom, the chat system may generate a second notification bar for the second new messages and may continuously display the second notification bar along with a first notification bar on the screen of a first chatroom. This will hereinafter be described with reference to FIGS. 8 through 13.

Figure 8:
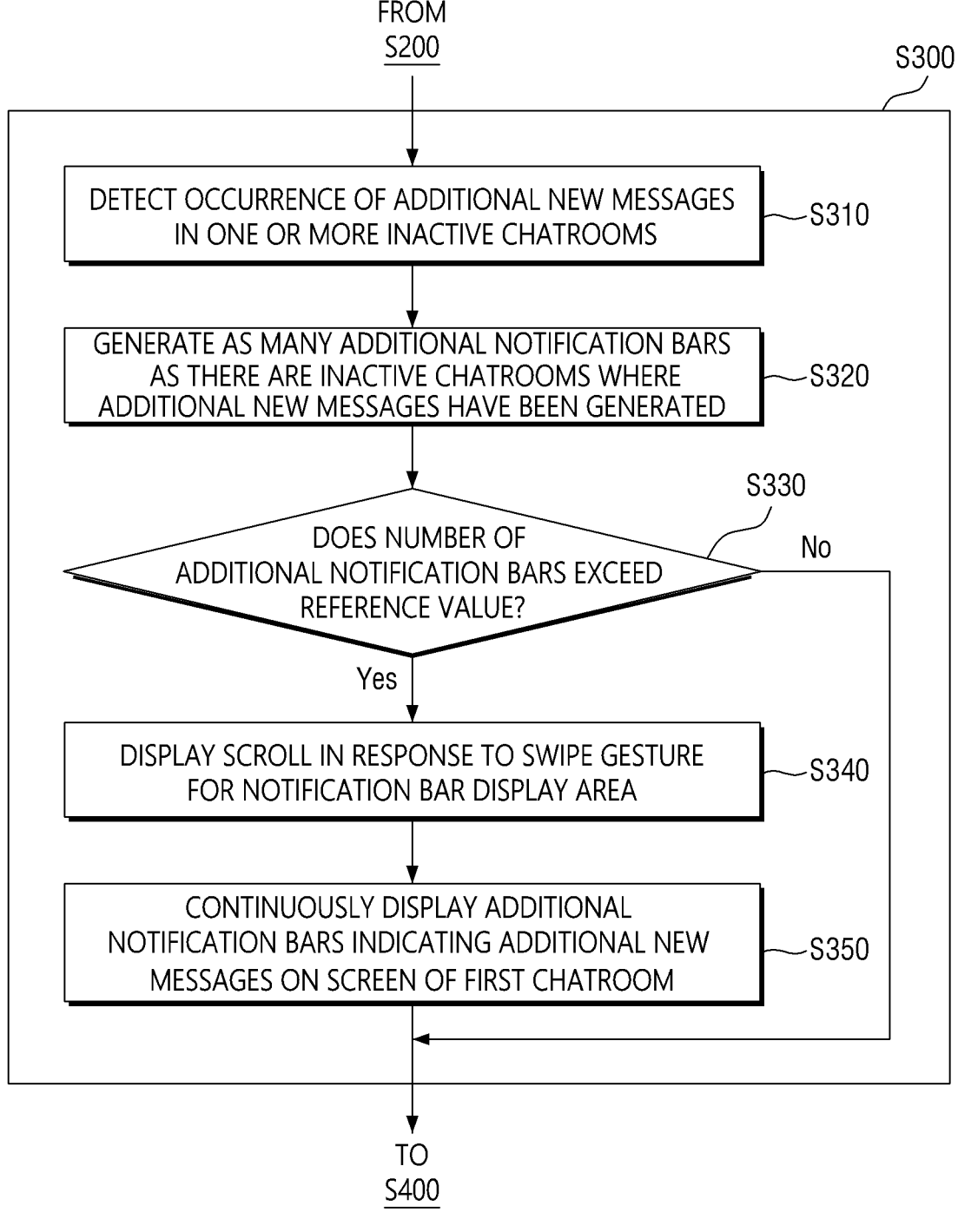
FIG. 8 is a detailed flowchart illustrating some operations of the method of FIG. 1.

FIG. 8 is a detailed flowchart illustrating a method of not generating a first notification bar using filtering information according to some embodiments of the present disclosure.

Referring to FIG. 8, after the generation of a first notification bar, i.e., step S200 of FIG. 1, the chat system may check for the occurrence of additional new messages in one or more inactive chatrooms, while excluding the currently active first chatroom (S310).

The additional new messages may represent additional new messages from a single third chatroom or from at least some third chatrooms from among the inactive chatrooms.

For convenience, it is assumed that multiple second new messages occur in multiple third chatrooms, but the present disclosure is not limited thereto.

Thereafter, the chat system may generate a number of additional notification bars (hereinafter referred to as "second notification bars") corresponding to the number of third chatrooms where multiple additional new messages have occurred (S320).

In this case, the chat system may generate multiple second notification bars indicating the additional new messages and display the second notification bars in a notification bar display area.

As the chat system displays both the first notification bar and the second notification bars on the screen of the first chatroom on the user terminal, the chat system may arrange the first notification bar and the second notification bars in random order or in the order of new message occurrences, but the present disclosure is not limited thereto.

The chat system may identify the maximum number of notification bars that may be displayed on the screen of the user terminal and the number of second notification bars additionally generated (S330).

Then, if the number of second notification bars additionally generated exceeds the maximum number of notification bars that may be displayed on the screen of the user terminal, the chat system may display a scroll that allows the user to swipe through the multiple second notification bars on the screen of the first chatroom (S340).

For example, the chat system may display a scroll in response to a swipe gesture for the notification bar display area within the screen of the first chatroom. As a result, the chat system allows the user to manually arrange multiple notification bars using the scroll.

Furthermore, the chat system enables the user to manipulate the screen of the first chatroom through swipe gestures for scrolling, allowing an unlimited number of second notification bars to be displayed.

That is, the chat system may continuously display the second notification bars indicating additional new messages on the screen of the first chatroom along with the first notification bar (S350).

In some embodiments, the chat system may display the first notification bar and the second notification bars in a specific order on the screen of the first chatroom according to priorities. This will be described later with reference to FIG. 9.

FIG. 9 is a flowchart illustrating the display of multiple notification bars according to priorities when additional new messages occur in some embodiments of the present disclosure.

Referring to FIG. 9, the chat system may receive from the user a priority list for multiple chatrooms where additional new messages have occurred, including a second chatroom. The system may also obtain reply patterns based on reply messages input by the user within the multiple chatrooms (S351).

Then, the chat system may determine the user's priorities for the multiple chatrooms based on the received priority list.

The priority list may include, for example, whether there is an indication of the user in the content of new messages or the frequency of new message occurrences in each particular chatroom, but the present disclosure is not limited thereto.

The chat system may determine priorities among multiple chatrooms by determining the importance of new messages and the user's preference for each particular chatroom based on the received priority list.

In some embodiments, the chat system may analyze and store the patterns of the user's responses or replies in the multiple chatrooms within the user terminal.

Therefore, the chat system may determine the priorities for the second chatroom and the other chatrooms where additional new messages have occurred (S352).

As a result, the chat system may determine the order in which the first notification bar and additional notification bars are aligned based on the determined priorities.

Specifically, if it is confirmed that the content of the first new message generated in the second chatroom includes an indication of the user, while it cannot be determined whether the content of additional new messages generated in a third chatroom includes an indication of the user, the chat system may display the first notification bar indicating the first new messages at a higher priority position within the screen of the first chatroom.

For example, the chat system may display the first notification bar at a location within the screen of the first chatroom that may be easily accessed by first-type user input, allowing the user to easily switch between and view chatroom screens.

In other words, the chat system may determine the order in which multiple notification bars are aligned, based on the priorities received and set in advance by the user or the user's reply patterns in the list of the multiple chatrooms, and may display the multiple notification bars on the screen of the first chatroom in the determined order (S353).

Consequently, the chat system may generate notification bars that make it easier and more convenient for the user to sort multiple chatrooms with multiple new messages, facilitating easier transition or navigation to those chatrooms.

For a better understanding, a method of aligning multiple notification bars will hereinafter be described with reference to FIG. 10.

Figure 10:
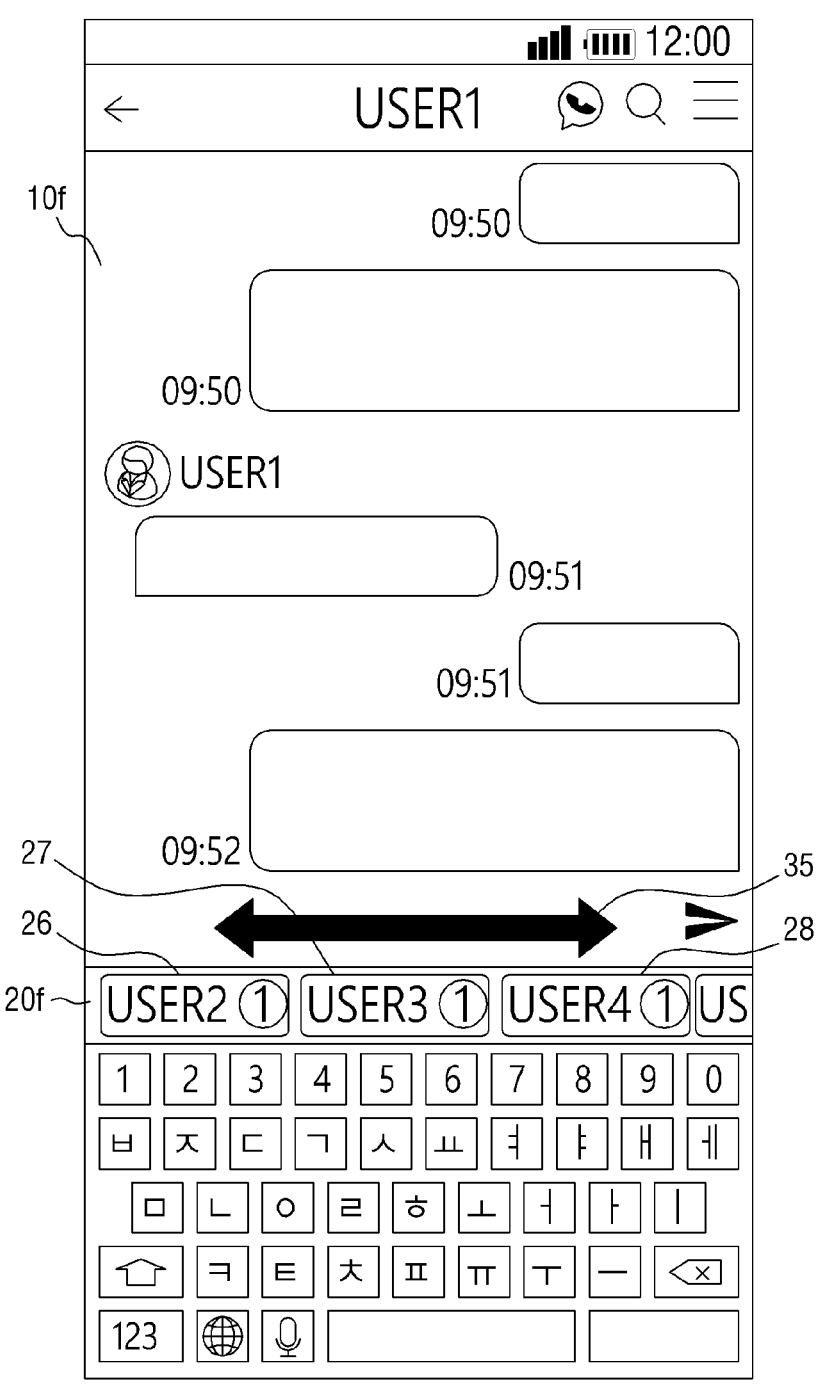
FIG. 10 is a schematic view illustrating how a plurality of notification bars may be switched using a scroll within a notification bar display area according to some embodiments of the present disclosure.

FIG. 10 is a schematic view illustrating the alignment of multiple notification bars within a notification bar display area using a scroll according to some embodiments of the present disclosure.

Referring to FIG. 10, the chat system displays multiple notification bars 26, 27, and 28 in a notification bar display area 20*f* on a screen 10*f* of a first chatroom that is currently active and displayed on the user terminal.

Specifically, the chat system may generate the notification bars 26, 27, and 28, which are associated with multiple new messages, and may align the notification bars 26, 27, and 28 with a scroll 35, which is additionally displayed.

Like notification bars, the scroll 35, which may be used for aligning multiple notification bars, may be generated in various forms.

The method of aligning multiple notification bars may be performed by the chat system in response to a swipe gesture being input on the screen 10*f* for the scroll 35 within the notification bar display area 20*f*.

The alignment of multiple notification bars using a scroll, in consideration of user priorities or user reply patterns, as discussed in the context of FIG. 9, will hereinafter be described with reference to FIG. 11.

Figure 11:
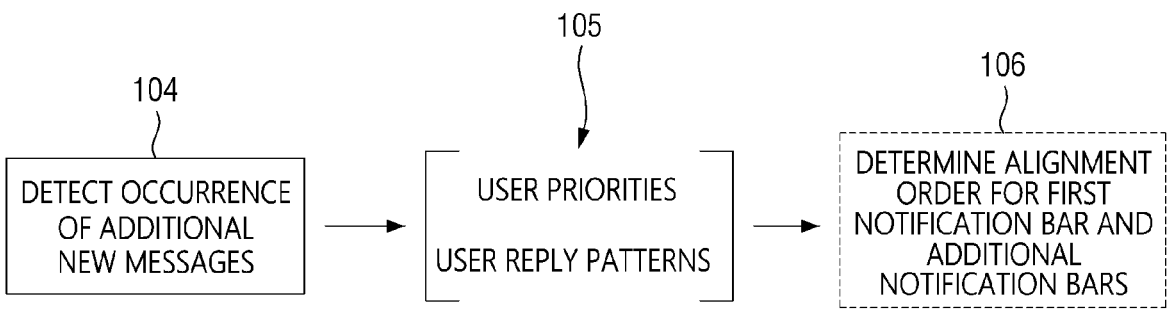
FIG. 11 is a flowchart illustrating the alignment of a plurality of notification bars based on user priorities or user reply patterns acquired according to some embodiments of the present disclosure.

FIG. 11 is a diagram illustrating the alignment of multiple notification bars based on user priorities or user reply patterns according to some embodiments of the present disclosure.

Specifically, referring to FIG. 11, when the occurrence or reception of multiple new messages is detected (104), the chat system may obtain and store user priorities or user reply patterns for the multiple chatrooms where the multiple new messages have occurred (105).

Thereafter, the chat system may determine priorities among the multiple chatrooms based on the obtained user priorities or user reply patterns and may determine the order in which notification bars indicating the multiple chatrooms are aligned based on the determined priorities (106).

Meanwhile, the chat system may display the screen of a second chatroom, instead of the screen of a first chatroom, in response to first-type user input being received for selecting one of a plurality of notification bars indicating a plurality of new messages that have occurred. This will be described later with reference to FIGS. 12 and 13.

Figure 12:
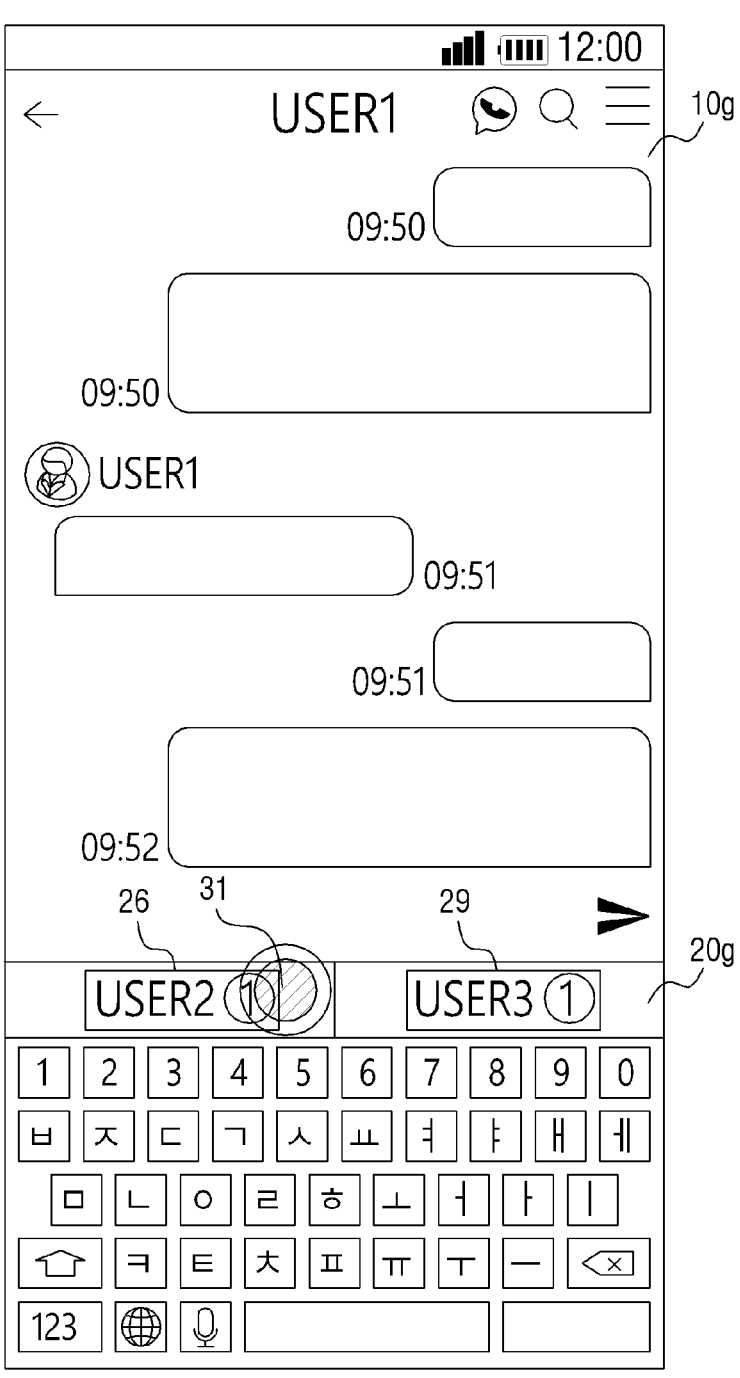
FIGS. 12 and 13 are schematic diagrams illustrating the persistence of a notification bar for an unvisited chatroom after transitioning from a first chatroom to a second chatroom according to some embodiments of the present disclosure.
Figure 13:
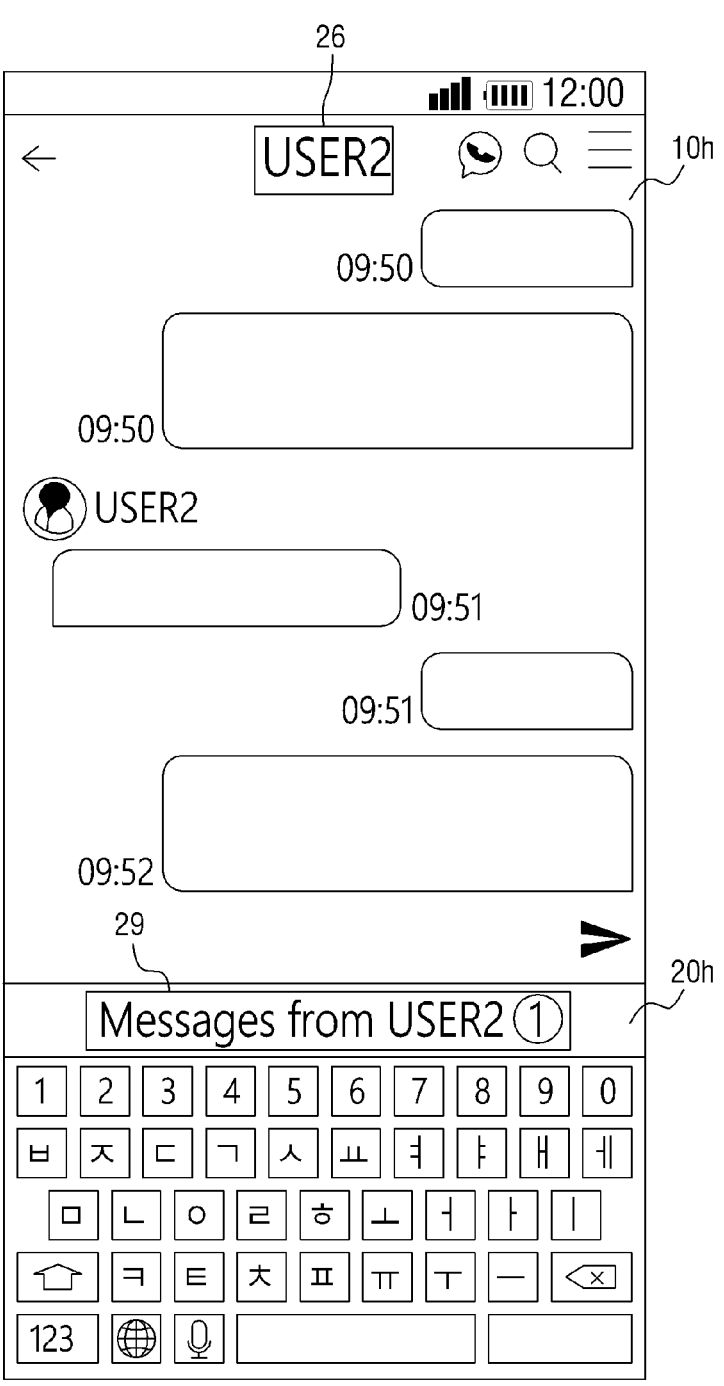

FIGS. 12 and 13 are schematic diagrams illustrating the persistence of a notification bar for an unvisited chatroom after transitioning from a first chatroom to a second chatroom according to some embodiments of the present disclosure.

Specifically, FIG. 12 illustrates a step in which the chat system generates multiple notification bars 26 and 29 indicating multiple new messages and displays the notification bars 26 and 29 on a screen 10*g* of the first chatroom.

Referring to FIG. 12, the chat system may receive first-type user input 31 to select the notification bar 26.

The notification bar 26 selected by the first-type user input may refer to a first notification bar according to some embodiments of the present disclosure. That is, the notification bar 26 may denote a chatroom that the chat system may transition to and display, the second chatroom, distinct from the first chatroom currently displayed on the user terminal.

As a result, the chat system may transition the user terminal to a screen 10*h* of the second chatroom in response to the first-type user input 31 of FIG. 12.

In other words, as depicted in FIGS. 12 and 13, the chat system may deactivate the first chatroom displayed on the user terminal and activate the second chatroom. Consequently, the chat system may display the screen 10h on the user terminal.

In this case, as illustrated in FIG. 13, the chat system may keep the notification bar 29, which has not been selected by the first-type user input 31 of FIG. 12, within the screen 10h of the second chatroom.

Accordingly, the chat system may enable the user to continuously check for any unseen new messages even during the screen transition between chatrooms.

So far, various embodiments of the chatroom transition simplification method have been described with reference to FIGS. 2 to 13. As mentioned, the chat system may implement a rapid and simplified screen transition method by performing various exemplary processes such as filtering and arrangement order adjustment for notification bars and providing previews for each transitioning chatroom.

An exemplary computing device 200 that may implement the chatroom transition simplification method will hereinafter be described with reference to FIG. 14. The computing device 200 may be a user terminal, and the user terminal may be a mobile terminal such as, for example, a desktop personal computer (PC) or a smartphone.

Figure 14:
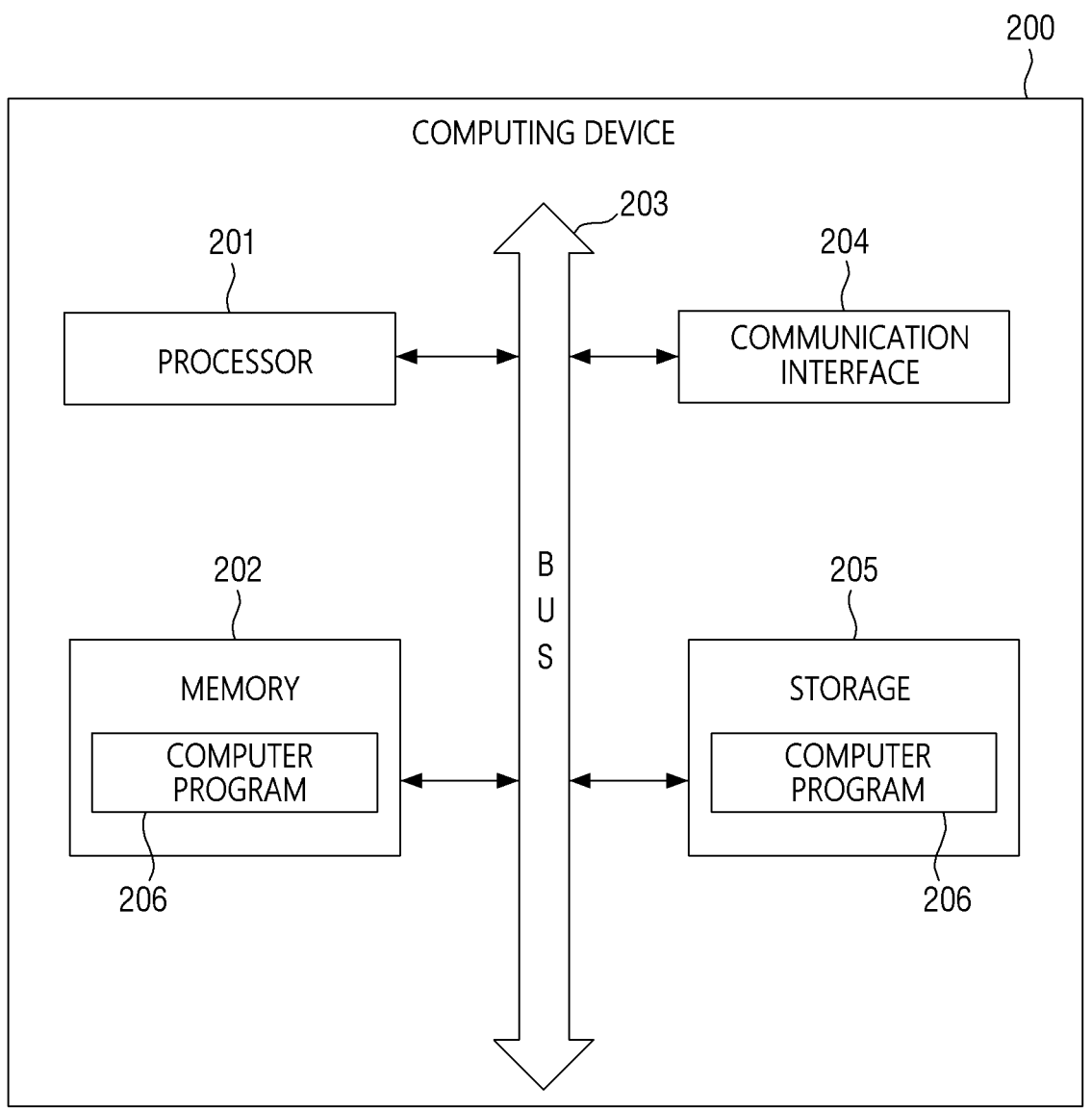
FIG. 14 is a hardware configuration view illustrating a computing system that may be used in some embodiments of the present disclosure.

FIG. 14 is an exemplary hardware configuration view illustrating the computing device 200.

Referring to FIG. 14, the computing device 200 may include at least one processor 201, a bus 203, a communication interface 204, a memory 202 for loading a computer program 206 executed by the processor 201, and a storage 205 for storing the computer program 206. FIG. 14 illustrates only components relevant to various embodiments of the present disclosure. Therefore, those skilled in the art to which the present disclosure pertains will understand that in addition to the components illustrated in FIG. 14, various general components may also be included in the computing device 200. In other words, the computing device 200 may further include various components in addition to those illustrated in FIG. 14. For example, the computing device 200 may further include a user interface (not illustrated) that receives user input. The user interface may include a pointing device such as a mouse, a stylus pen, a touch display, or a touchpad. Furthermore, the computing device 200 may be configured with some of the components illustrated in FIG. 14 omitted. Each of the components of the computing device 200 will hereinafter be described.

The processor 201 may control the overall operations of the components of the computing device 200. The processor 201 may be configured with at least one form of processor known in the art, such as a central processing unit (CPU), a microprocessor unit (MPU), a microcontroller unit (MCU), a graphic processing unit (GPU), or any other type of processor recognized in the technical field of the present disclosure. Additionally, the processor 201 may perform operations related to at least one application or program to execute operations/methods according to various embodiments of the present disclosure. The computing device 200 may be equipped with at least one processor 201.

The memory 202 may store various data, commands, and/or information. The memory 202 may load the computer program 206 from the storage 205 to execute the operations/methods according to various embodiments of the present disclosure. The memory 202 may be implemented as a volatile memory, such as a random-access memory (RAM), but the present disclosure is not limited thereto.

The bus 203 may provide communication between the components of the computing device 200. The bus 203 may be implemented in various forms, including an address bus, a data bus, and a control bus.

The communication interface 204 may support wired and wireless internet communication for the computing device 200. Additionally, the communication interface 204 may support various communication methods beyond Internet communication. To this end, the communication interface 204 may be configured with well-known communication modules in the technical field of the present disclosure.

The storage 205 may non-transitorily store at least one computer program 206. The storage 205 may be configured with nonvolatile memories such as a read-only memory (ROM), an erasable programmable ROM (EPROM), an electrically erasable programmable ROM (EEPROM), or a flash memory, hard disks, removable disks, or other forms of computer-readable media known in the technical field of the present disclosure.

The computer program 206 may include one or more instructions that enable processor 201 to perform the operations/methods according to various embodiments of the present disclosure when loaded into memory 202. In other words, by executing the loaded instructions, the processor 201 may perform the operations/methods according to various embodiments of the present disclosure.

For example, the computer program 206 may include instructions for executing the operations of: continuously displaying a first notification bar indicating first new messages occurred in a second chatroom, when a first chatroom is active and the screen of the first chatroom is being displayed on the user terminal of a user; and activating the second chatroom, instead of the first chatroom, and displaying the screen of the second chatroom, instead of the screen of the first chatroom, in response to first-type user input selecting the first notification bar.

So far, a variety of embodiments of the present disclosure and the effects according to embodiments thereof have been mentioned with reference to FIGS. 1 to 14. The effects according to the technical idea of the present disclosure are not limited to the forementioned effects, and other unmentioned effects may be clearly understood by those skilled in the art from the description of the specification.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results may be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications may be made to the example embodiments without substantially departing from the principles of the present disclosure. Therefore, the disclosed example embodiments of the disclosure are used in a generic and descriptive sense only and not for purposes of limitation.

What is claimed is:

1. A method of performing chatroom transition, performed by a user terminal, the method comprising:

displaying a preview popup for at least one first new message occurring in a second chatroom on a screen of a first chatroom for a predetermined amount of time;

in response to the predetermined amount of time elapsing, removing the preview popup and displaying a first notification bar indicating the at least one first new message on the screen of the first chatroom, wherein the first notification bar is continuously maintained on the screen of the first chatroom until a user input to remove the first notification bar is received;

based on at least one second new message occurring in a third chatroom while the first notification bar is displayed, displaying a second notification bar indicating the at least one second new message on the screen of the first chatroom along with the first notification bar; and in response to a first user input to select the first notification bar, activating the second chatroom and displaying a screen of the second chatroom instead of the screen of the first chatroom, wherein the displaying of the screen of the second chatroom comprises continuously displaying the second notification bar on the screen of the second chatroom.

2. The method of claim 1, wherein the first notification bar displays an indicator for the second chatroom, and the indicator for the second chatroom includes at least one of a name of the second chatroom or at least one participant in the second chatroom.

3. The method of claim 1, wherein the displaying the first notification bar comprises displaying the first notification bar on or above a keypad area on the screen of the first chatroom.

4. The method of claim 1, wherein the displaying the first notification bar comprises displaying a content of the at least one first new message in response to a second user input to select the first notification bar, the second user input being a different input type than the first user input.

5. The method of claim 4, wherein the displaying the content of the at least one first new message comprises displaying the content of a most recently occurring first new message among the at least one first new message occurring in the second chatroom.

6. The method of claim 1, wherein the displaying the first notification bar comprises displaying a preview screen for the second chatroom in response to a third user input to select the first notification bar, the third user input being a different input type than the first user input.

7. The method of claim 6, wherein the third user input is a long tap, and the displaying the preview screen for the second chatroom comprises removing the preview screen for the second chatroom in response to the long tap being cancelled.

8. The method of claim 1, wherein the displaying the first notification bar comprises displaying the first notification bar on the screen of the first chatroom only based on the at least one first new message or information regarding the second chatroom satisfying a predefined condition.

9. The method of claim 8, wherein the displaying the first notification bar comprises displaying the first notification bar on the screen of the first chatroom only based on the information regarding the second chatroom representing a group chatroom and an indication of a user of the user terminal being included in a content of at least one first new message occurring in the group chatroom.

10. The method of claim 1, wherein the continuously displaying the second notification bar comprises:

based on at least one additional new message occurring in one or more inactive chatrooms, continuously displaying one or more additional notification bars corresponding to the one or more inactive chatrooms on the screen of the first chatroom, the one or more additional notification bars indicating the at least one additional new message; and based on a number of the one or more additional notification bars exceeding a reference value, providing a scroll for the first notification bar and the one or more additional notification bars in response to a swipe gesture in a notification bar display area on the screen of the first chatroom.

11. The method of claim 1, wherein the continuously displaying the second notification bar comprises determining a priority of the second chatroom and a priority of the third chatroom and determining a display location of the first notification bar and a display location of the second notification bar based on the determined priorities.

12. The method of claim 11, wherein the determining the display locations of the first and second notification bars comprises displaying the first notification bar at a higher priority location based on an indication of a user of the user terminal being included in a content of the at least one first new message occurring in the second chatroom, but not in a content of the at least one second new message occurring in the third chatroom.

13. The method of claim 11, wherein the determining the display locations of the first and second notification bars comprises displaying the first notification bar at a higher priority location based on an occurrence frequency of the at least one first new message in the second chatroom being higher than an occurrence frequency of the at least one second new message in the third chatroom.

14. The method of claim 11, further comprising:

analyzing, for a user of the user terminal, a reply pattern for the second chatroom and a reply pattern for the third chatroom; and determining the display locations of the first notification bar and the second notification bar based on the analyzed reply patterns and the determined priorities.

15. A chat system comprising:

one or more processors; and a memory configured to store one or more instructions, wherein the one or more processors are configured to, by executing the one or more instructions stored in the memory, perform:

displaying a preview popup for at least one first new message occurring in a second chatroom on a screen of a first chatroom for a predetermined amount of time;

in response to the predetermined amount of time elapsing, removing the preview popup and displaying a first notification bar indicating the at least one first new message on the screen of the first chatroom, wherein the first notification bar is continuously maintained on the screen of the first chatroom until a user input to remove the first notification bar is received;

based on at least one second new message occurring in a third chatroom while the first notification bar is displayed, displaying a second notification bar indicating the at least one second new message on the screen of the first chatroom along with the first notification bar; and in response to a first user input to select the first notification bar, activating the second chatroom and displaying a screen of the second chatroom instead of the screen of the first chatroom, wherein the displaying of the screen of the second chatroom comprises continuously displaying the second notification bar on the screen of the second chatroom.

16. A non-transitory computer-readable recording medium storing a computer program, which, when executed by at least one processor, causes the at least one processor to perform:

displaying a preview popup for at least one first new message occurring in a second chatroom on a screen of a first chatroom for a predetermined amount of time;

in response to the predetermined amount of time elapsing, removing the preview popup and displaying a first notification bar indicating the at least one first new message on the screen of the first chatroom, wherein the first notification bar is continuously maintained on the screen of the first chatroom until a user input to remove the first notification bar is received;

based on at least one second new message occurring in a third chatroom while the first notification bar is displayed, displaying a second notification bar indicating the at least one second new message on the screen of the first chatroom along with the first notification bar; and in response to a first user input to select the first notification bar, activating the second chatroom and displaying a screen of the second chatroom instead of the screen of the first chatroom, wherein the displaying of the screen of the second chatroom comprises continuously displaying the second notification bar on the screen of the second chatroom.

\* \* \* \* \*